United States Patent [19]

Andreas

[11] Patent Number: 4,962,735
[45] Date of Patent: Oct. 16, 1990

[54] INTAKE SYSTEM FOR MULTI-CYLINDER INTERNAL COMBUSTION ENGINES

[75] Inventor: Bilek Andreas, Graz, Austria

[73] Assignee: Avl Gesellschaft für Verbrennungskraftmaschinen und Messtechnik m.b.H. Prof.Dr.Dr.h.c. Hans List, Graz, Austria

[21] Appl. No.: 467,247

[22] Filed: Jan. 19, 1990

[30] Foreign Application Priority Data

Jan. 20, 1989 [AT] Austria .................................. 115/89

[51] Int. Cl.$^5$ ............................................. F02M 35/00
[52] U.S. Cl. ............................................. 123/52 MV
[58] Field of Search ........ 123/52 M, 52 MV, 52 MC, 123/52 MF, 52 MB

[56] References Cited

U.S. PATENT DOCUMENTS

| | | | | |
|---|---|---|---|---|
| 4,726,329 | 2/1988 | Atkin | ............................ | 123/52 MV |
| 4,803,961 | 2/1989 | Hiraoka et al. | ................ | 123/52 MV |
| 4,809,647 | 3/1989 | Masumoto et al. | ........... | 123/52 MB |

FOREIGN PATENT DOCUMENTS

| | | | | |
|---|---|---|---|---|
| 0079038 | 5/1984 | Japan | .................................. | 123/52 M |
| 0208121 | 11/1984 | Japan | ............................... | 123/52 MB |
| 0116022 | 6/1986 | Japan | .................................. | 123/52 M |
| 0280822 | 11/1988 | Japan | .................................. | 123/52 M |

*Primary Examiner*—David A. Okonsky
*Attorney, Agent, or Firm*—Watson, Cole, Grindle & Watson

[57] ABSTRACT

An intake system for multi-cylinder internal combustion engines, in particular of a V-type design, whose suction pipes extend in longitudinal direction and are connected to the intake channel leading towards the intake valve by means of passages of different lengths, a control element being provided for selectively activating one of the two flow paths. The design is kept simple by providing only one control element for controlling the inlets of two groups of intake pipes, the connection between one of the intake pipes, or rather, one of the two pairs of intake pipes, and the intake channel being established via manifold passages of one length, and the connection of the other intake pipe, or pair of intake pipes, via manifold passages of a different length.

5 Claims, 2 Drawing Sheets

INTAKE SYSTEM FOR MULTI-CYLINDER INTERNAL COMBUSTION ENGINES

BACKGROUND OF THE INVENTION

This invention relates to an intake system for multi-cylinder internal combustion engines, in particular of a V-type design, whose suction pipes extend in longitudinal directions and are connected to the intake channel leading towards the intake valve by means of manifold passages or risers of different lengths, a control element being provided for selectively activating one of the two flow paths.

DESCRIPTION OF THE PRIOR ART

Such intake systems are described in DE-OS 34 33 011 or EP-A1-02 01 180, for instance. In these known variants each manifold passage has its own control element, by which the effective length of the passage may be modified. In the version described in EP-A1-02 01 180, for example, the manifold passages are wound around an intake pipe, each passage having an opening which can be closed by means of a control element. Depending on the position of this control, the intake air will enter the manifold either at the point where the manifold passage opens into the main intake pipe or through an opening controlled by the control element which is placed at some distance from this entrance point, i.e., near the respective intake channel, thus resulting in different intake lengths.

The disadvantages of these known solutions is that a large number of control elements are needed, since a separate control is required for each manifold passage.

SUMMARY OF THE INVENTION

It is an object of this invention to avoid this disadvantage and to propose an intake system as mentioned in the initial paragraph which will permit modification of the intake length in a simple manner.

This is achieved by providing only one control element for the control of the inlets of two pairs of intake pipes, the connection between one pipe, or one of the pairs of pipes, and the intake channel being established by manifold passages of one length, and that of the other pipe, or other pair of pipes, by passages of a different length.

In this way one single control element, e.g., a flap, will suffice to control the intake lengths of all manifold passages. This will simplify the design considerably, in addition to making it fairly compact.

According to another feature of the invention two outer intake pipes and two inner intake pipes may be combined into a pair each, which is directly connected with the supply line via the control element. Furthermore, one of the pairs of pipes may be connected with the control element via a main intake pipe.

In this manner a particularly simple design of the intake system is obtained.

For greater compactness of the intake system the manifold passages connecting to the outer intake pipes may have joint walls with the corresponding inner intake pipes, and each of these walls may be provided with an opening in those areas of the joint walls of the inner pipes and the manifold passages which are closer to the intake channels, the manifold passages preferably being located above the inner pipes.

Due to the above measures and the use of a central control element, the intake length of each cylinder may be modified by means of the control element, and the design of the intake system may be kept simple.

In order to obtain a particularly compact design the manifold passages of the outer intake pipes may penetrate the inner intake pipes and may be provided with the beak-shaped mouthpieces at the openings. In this way the system height may be miminised.

BRIEF DESCRIPTION OF THE DRAWINGS

Following is a more detailed description of the invention as illustrated by the attached drawings, in which.

DETAILED DESCRIPTION OF PREFERRED EMBODIMENTS

The cylinder banks 1 and 2 of the engine, each of which comprises three cylinders, are arranged such that their axes 1' and 2' form a V. The axes of the intake valves facing one another, i.e., indicated by the valve seat rings 3 and 4, have the reference numbers 5 and 6, while those of the exhaust valves on the outside are referred to as 7 and 8.

Figure 2:
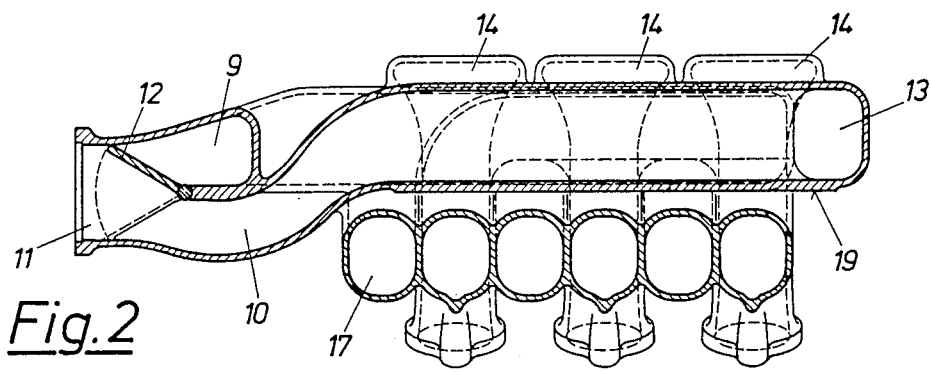
FIG. 2 gives a section along line II—II in FIG. 1 on a reduced scale.
Figure 3:
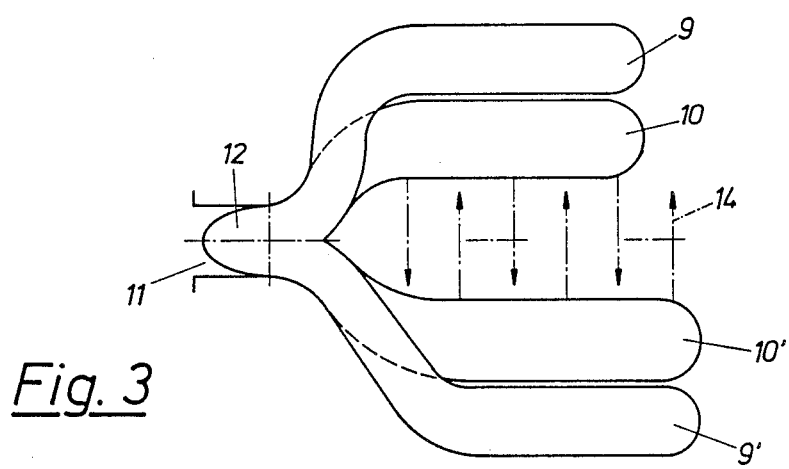
FIGS. 3 and 4 are schematical views of two other variants of intake pipes.
Figure 4:
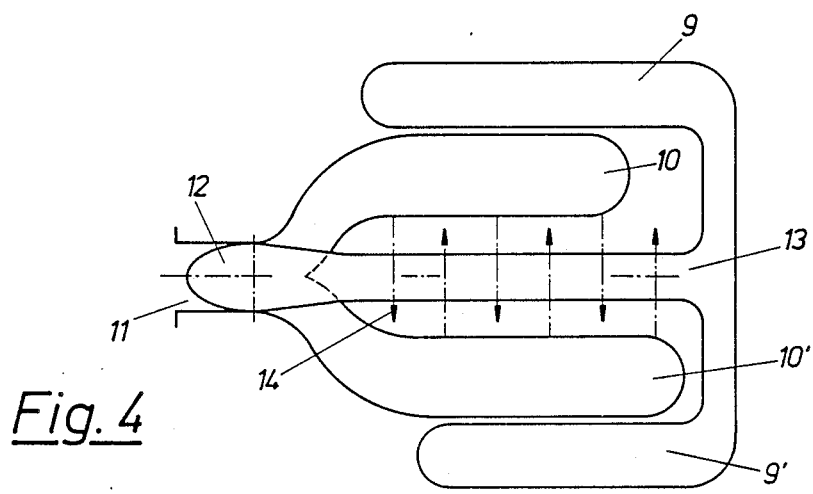

As is seen in FIGS. 2 to 4, the intake system has two intake pipes, or pairs of intake pipes, i.e., 9 and 10, which branch off from a chamber 11 containing a control element configured as a flap 12. This control element may be actuated to open or close the opening of the chamber 11 leading into one of the two intake pipes, or pairs of intake pipes, 9 or 10. One of the intake pipes, i.e., 9, branches off from the chamber 11 in upward direction, while the other one, i.e., 10, is a downward branch.

The intake pipes are arranged in pairs, pipes 9, 9' being situated on the outside, and pipes 10, 10' on the inside. These pairs 9, 9' and 10, 10' issue from the chamber 11 through one common channel.

In this context there are two alternatives: Either both pairs of intake pipes 9, 9' and 10, 10' are direct branch-offs from chamber 11 (cf. FIG. 3), or one of the two pairs of intake pipes 9, 9' is connected with chamber 11 by means of a main intake pipe 13 (cf. FIG. 4).

Figure 1:
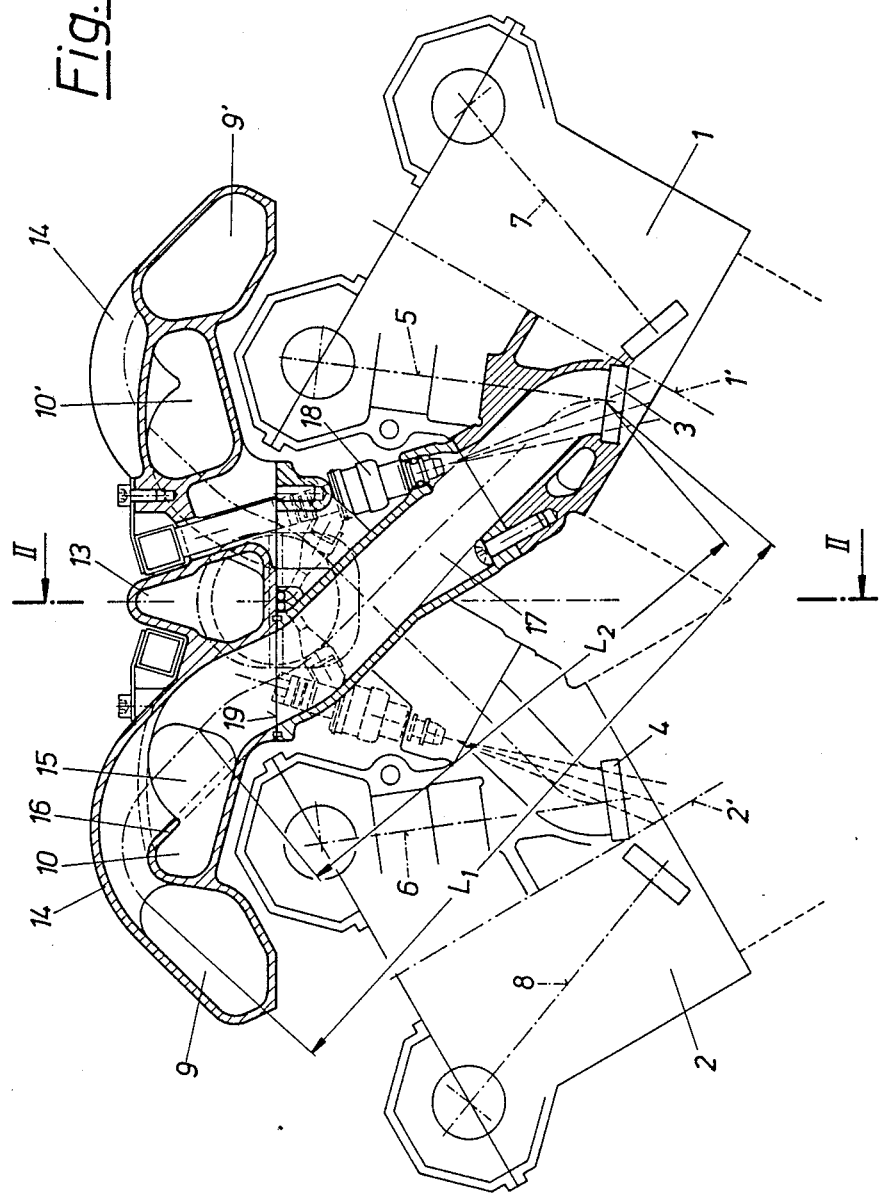
FIG. 1 is a schematical view of the intake system according to the invention, as a section normal to the crankshaft axis.

As is shown in FIG. 1, the manifold passages 14 are connected to the pipes 9, 9' on the outside and are placed above the inner pipes 10, 10'. The passages 14 and the inner pipes 10, 10' have joint walls provided with openings 15, through which the passages 14 partly penetrate the corresponding inner pipe 10, 10'. In this way beak-shaped mouthpieces or snouts 16 are obtained, which are formed by the joint wall sections of the passages 14 and the corresponding inner pipes 10, 10'.

The passages 14 leave the outer pipes 9, 9' and cross the inner pipes 10, 10', finally leading towards the cylinder feeder channels 17, which are combined into one unit serving both banks.

In the instance of air delivery through the pipes 9, 9', the air will cross the inner pipes 10, 10'. It will cross the inner pipe 10 or 10' through the passage 14 from the outer pipe 9 or 9' by way of a mouthpiece 16 projecting into the pipe 9 or 9' like a beak. This will counteract the tendency of the flow to separate from the walls as the charge is flowing through the pipe 9, 9']via the passage 14 into the corresponding feeder channel 17 over the greater length $L_1$, in addition to improving the flow from the inner pipe 10 into the passage 14 towards the feeder channel 17 over the shorter length $L_2$, the mouthpiece 16 helping to direct the flow. In this manner an intersection of two passages without detrimental interference is achieved, permitting a most compact design.

The feeder channels 17 combined into one unit are attached to the two cylinder banks 1 and 2. This unit also comprises the injection nozzles 18. The intake pipes 9, 9', 13, 10, 10' and the corresponding manifold passages 14 are configured as an integrated component which is connected with the feeder channels 17 along the flange surface 19. This component could also be moulded from a plastic material, possibly in two parts.

I claim:

1. An intake system for multi-cylinder internal combustion engines of a V-type design, comprising suction pipes running in longitudinal direction of said combustion engine, said suction pipes are connected to intake channels leading towards intake valves of said multi-cylinder internal combustion engine by means of manifold passages, wherein two pairs of said suction pipes are provided, each said pair of suction pipes having a common inlet end, said pair of inlet ends are connected with a supply line, wherein only one control element is provided for selectively opening one of said inlet ends, a connection between one of said pairs of suction pipes and said intake channels being established by manifold passages of one length $L_2$, and that of the other pair of said suction pipes by manifold passages of a different length $L_2$.

2. An intake system according to claim 1, wherein two of said suction pipes lie laterally outwardly beyond two inner of said suction pipes with respect to the longitudinal axis of the engine, each of said outer suction pipes and inner suction pipes forming said respective pairs.

3. An intake system according to claim 1, wherein one pair of said suction pipes is connected with said control element via a main intake pipe.

4. An intake system according to claim 2, wherein said manifold passages connected to said outer suction pipes have joint walls with said corresponding inner suction pipes, each of said walls is provided with an opening in an area of said inner suction pipes and said manifold passages being located above said inner suction pipes.

5. An intake system according to claim 4, wherein said manifold passages of said outer suction pipes penetrate said inner suction pipes and are provided with beak-shaped mouthpieces at said openings.

* * * * *

UNITED STATES PATENT AND TRADEMARK OFFICE
CERTIFICATE OF CORRECTION

PATENT NO. : 4,962,735
DATED : October 16, 1990
INVENTOR(S) : Andreas Bilek

It is certified that error appears in the above-identified patent and that said Letters Patent is hereby corrected as shown below:

Title Page: Item [19] "Andreas" should read --Bilek--.

[75] Inventor: should read --Andreas Bilek, Graz, Austria--.

Signed and Sealed this

Seventh Day of January, 1992

Attest:

HARRY F. MANBECK, JR.

*Attesting Officer*   *Commissioner of Patents and Trademarks*